(No Model.)
J. F. LONERGAN.
COCK OR FAUCET.
No. 453,012. Patented May 26, 1891.
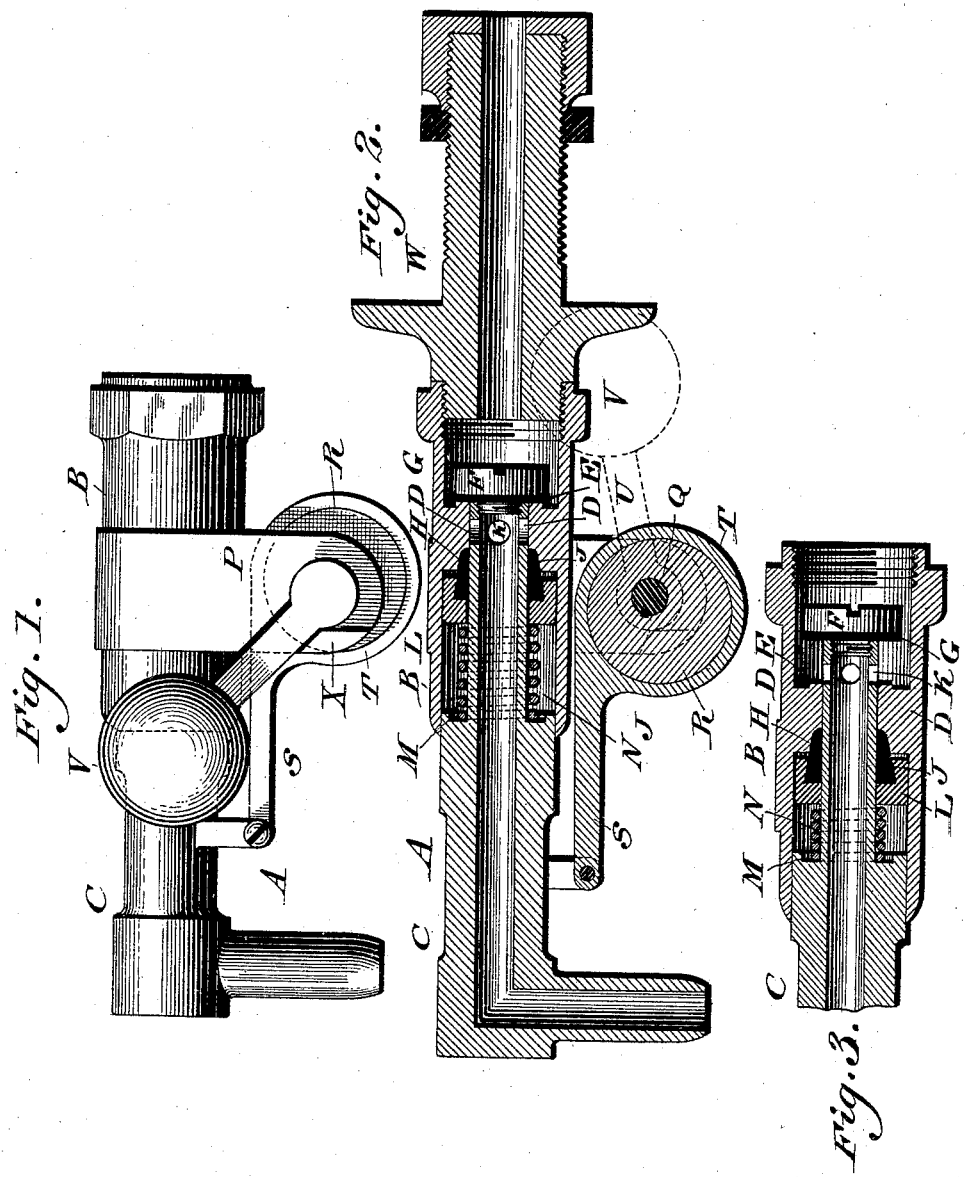
WITNESSES:
INVENTOR
James F. Lonergan
BY
ATTORNEY.

UNITED STATES PATENT OFFICE.

JAMES F. LONERGAN, OF PHILADELPHIA, PENNSYLVANIA.

COCK OR FAUCET.

SPECIFICATION forming part of Letters Patent No. 453,012, dated May 26, 1891.

Application filed March 1, 1890. Serial No. 342,232. (No model.)

*To all whom it may concern:*

Be it known that I, JAMES F. LONERGAN, a citizen of the United States, residing in the city and county of Philadelphia, State of Pennsylvania, have invented a new and useful Improvement in Cocks or Faucets, which improvement is fully set forth in the following specification and accompanying drawings.

My invention relates to improvements in cocks or faucets, and has for its object the construction of a cock or faucet having a valve connected with the nozzle thereof of such character as to prevent any leakage of the liquid between the joints or bearings of the nozzle and barrel; and for this purpose it consists of the combination of parts hereinafter described.

Figure 1 represents a side elevation of a cock or faucet in open position embodying my invention. Fig. 2 represents a longitudinal section of the same in closed position. Fig. 3 represents a view of a portion of Fig. 2, showing the valve opened.

Similar letters of reference indicate corresponding parts in the several figures.

Referring to the drawings, A designates a cock or faucet having the barrel or tube B, which receives the liquid to be discharged, and a sliding tube or nozzle C, telescoping within the barrel B, as shown. On the inner wall of the barrel B is a circular flange D, having on one side a raised portion or boss E, forming a seat for the head F of a valve G. The other side of the flange D has a recessed or beveled portion H, in which is seated an elastic or rubber ring or packing J, encircling the nozzle C. The end of the nozzle C which is within the barrel B is reduced in thickness and has bearings on the wall of the flange D, the enlarged end or portion not reduced of the nozzle C having bearings in the outer end of the barrel B. The head F, having an intervening washer or packing G, closes the inner end of the nozzle C, to which it is secured, and the said nozzle has in its sides near said head the openings K for the passage of the liquid from the barrel B into the said nozzle C. The outer edge of the packing G is flush with the periphery of the head F and the diameter of the said head is such as to permit the flow of the water between the same and the walls of the barrel B when the valve is open.

On the reduced portion of the nozzle C is a sleeve or collar L, of metal, having a recessed portion on one side to receive one end of the elastic ring or packing J. Between said collar L and a shoulder M, formed by the reduced portion on the nozzle C, is a spring N, which is adapted to keep the collar L and packing J in close contact and hold the packing J in its seat H.

Mounted in the ears P, which are secured to the barrel B, is a shaft Q, having an eccentric R thereon, and pivotally secured to the nozzle C is an arm S, having a yoke T at one end, which embraces the eccentric R. A crank-arm with a handle U, attached to the shaft Q, operates the eccentric R, and thereby the arm S and nozzle C, so as to either open or close the valve, according to the direction in which the said arm is moved. A weight V, attached to the crank-arm U, assists in operating the said arm.

The barrel B, as shown, is secured to an attachment W, adapted to be connected with the receptacle containing the liquid which is to be drawn off.

The operation of the device is simple and easily understood. The parts being in position as shown in Fig. 2, or in closed condition, when it is desired to open the cock the handle U, with crank-arm, is rotated with the shaft Q until the arm is stopped by the shoulder or projection X on one of the ears P, so that the eccentric R operates the yoke T and its arm, thus drawing the nozzle C inward, whereby the openings in the sides thereof are uncovered and the liquid from the barrel B is permitted to pass through the same into the tube or nozzle C, from whence it flows. While the valve G is open the shoulder M, bearing against the spring N, forces the collar L against the packing J, so that the latter is held firmly in its seat H on the flange D, whereby a very close or tight joint is formed during the passage of the liquid into the nozzle C. When it is desired to close the cock, the handle is rotated or swung to the rear of the shaft Q, when the nozzle C slides outward, so that the head F, with its packing K, is brought in contact with its seat E, the openings K being covered by the walls of the flange D. At the same time the tension of the spring N holds the elastic ring or packing J in its seat H, whereby a second joint with packing is formed between the water in the end of the tube B and the outer joint of the barrel B and tube C.

Having thus described my invention, what I claim as new, and desire to secure by Letters Patent, is—

1. A cock or faucet having a barrel with a valve-seat and provided with ears, a sliding tube or nozzle with valve, a spring surrounding a part of said tube or nozzle, a shaft mounted in said ears and provided with an eccentric, and an arm pivotally connected with the nozzle and having a yoke embracing said eccentric, a weighted crank-arm on said shaft with a handle, and a projection on one of said ears forming a stop for said crank-arm, said parts being combined substantially as described.

2. The combination of a barrel with a flange on its inner wall, a boss on one side of said flange, a sliding nozzle with openings in its sides near its inner closed end, said boss on the flange forming a seat for the enlarged inner end of the nozzle, having a packing on its under face adapted to come in contact with said boss, a beveled portion on the other side of the flange forming a seat for an elastic packing, and a spring on the nozzle bearing against and seating said elastic packing, substantially as described.

3. A cock or faucet having a sliding discharge tube or nozzle with a closed inner end and provided with an opening in its side near the inner end thereof, a barrel having a flange in which said nozzle is adapted to move, said flange having a beveled portion on one side between the said opening in the side of the nozzle and the discharge end thereof and on the other side a raised portion or boss, an elastic packing in said beveled portion, a collar with a recessed portion in which one end of the elastic packing is received, and a spring between said collar and the shouldered end of the nozzle, said parts being combined substantially as described.

JAMES F. LONERGAN.

Witnesses:
JOHN A. WIEDERSHEIM,
WM. C. WIEDERSHEIM.